Patented Dec. 5, 1939

2,181,913

UNITED STATES PATENT OFFICE 2,181,913

IMPROVED HYDROCARBON COMPOSITION

Raphael Rosen, Cranford, N. J., assignor to Standard Oil Development Company, a corporation of Delaware No Drawing. Application April 7, 1934,
Serial No. 719,603

19 Claims. (Cl. 87—9)

The present invention relates to improved lubricating and similar oils, which are ordinarily exposed to high temperature conditions as in automotive engines, characterized by increased stability under such conditions, and more specifically to lubricating oil and grease compositions containing metallo-organic stabilizing agents. The invention will be fully understood from the following description.

The effect of various addition agents on lubricating oils, transformer oils and greases, is known, and more particularly the anti-sludge-forming effect of lead and tin alkyl and aryl compounds, for example, lead tetraethyl, tin tetraphenyl and the like.

It has been found that these metallo-organic agents are not the only ones which possess non-sludging properties, but there are others which are useful even to a greater degree. Among these may be mentioned generally the alkyl and aryl compounds of the metals of the second, third and fifth groups of the periodic table of elements. By the term "metallo-organic" it is intended to describe organic materials in which the metallo element is directly joined to at least one carbon atom of the organic radical which may be a paraffinic or aliphatic radical, or, on the other hand, an aromatic or aryl radical.

The efficacy of the particular compounds for the purpose in hand depends on the constitution. It seems to be a general rule that in any particular group of the periodic table of elements, the metal of the heavier molecular weight is more effective than a lighter metal, also that the elements of the right-hand or second such groups are more desirable than those of the left-half or first such group. Some of the metallo elements, notably bismuth and mercury, are usually more powerful than others, for example arsenic and magnesium. However, the influence of the organic radical is of equal importance. In general the aryl or aromatic groups are much more desirable than the alkyl or paraffinic radicals, although both show activity to more or less degree.

The most important of the metals to be used are mercury, cadmium, zinc, aluminum, thallium, bismuth and antimony. As to the organic portion of the compounds, the simple alkyl hydrocarbon radicals may be used, such as ethyl, methyl, propyl, butyl and the like, whether straight chained or branch chained, and these are satisfactory particularly at high temperatures say 200°, 250° C. and higher. The cyclic radicals such as phenyl, naphthyl, anthryl, are of much greater importance because they have a greater range of effectiveness both at low temperatures 100 to 150° C. and high temperatures from 200 to 250° C. and up. The alkylated aromatic radicals, of which tolyl, alpha and beta normal or isopropyl-naphthyl, primary or secondary hexyl, naphthyl or anthryl compounds may be given as examples, are especially desirable but the aryl substituted aliphatics such as diphenyl methane are also satisfactory. In some cases it is preferred to use the alkylated aromatic compounds to the unalkylated in order to obtain a greater solubility, although it must be appreciated that the substances of this class are ordinarily freely soluble in hydrocarbon oil and likewise that they are used in very minute quantities.

In the metallo-organic compounds all of the organic radicals may be similar, as in mercury ditolyl, or cadmium diethyl, or they may be different, as in diphenyl-ethyl bismuthine and one or more valences of the metal may be attached to hydrogen atoms.

It should also be understood that the organic radicals need not be purely a hydrocarbon although it is generally so preferred, for example, they may contain hydroxy and amino groups, and of particular importance are the hydroxy and amino derivatives of the aryl compounds. In some instances it is desirable to produce metallo-organic salts, such as mercury phenyl acetate, bismuth dinaphthyl naphthenate or cresyl-zinc chloride or bromide, acetate or sulphides, selenides, tellurides, or polysulphides and the like. These compounds containing the metallo-organic linkage in distinction from ordinary metallic soaps or salts, are satisfactory for the present purposes so long as they are sufficiently soluble in the hydrocarbon oil.

While the exact nature of these various compounds and the mechanisms by which they improve the lubricating oil are not particularly understood, it is observed that all appear to show in greater or lesser degree the property of decreasing the sludging tendency of the oil, which means that decomposition products formed under their influence whatever their nature, are for the most part, freely soluble or, at least, dispersible in the oil and that the tendency toward precipitation is thus greatly diminished.

As noted before the whole class of substances show a general property of reducing sludge formation, but the action of the several compounds is not exactly the same. Some of the compounds especially those which do not contain aryl groups are observed to increase oxidation rate of the oil at low temperature (100 to 150° C.) but become effective retarders of such oxidation only at higher temperatures (200 to 250° C.). Others particularly those containing aryl or substituted aryl groups retard oxidation throughout the whole range. No explanation of this behavior is presented and it should be noted that all show decrease in sludge forming tendency of oils which ordinarily produce a substantial quantity of sludge. It is not desired to infer from the above that sludge formation is the result of oxidation as is sometimes thought and it is specifically desired not to limit the present invention to any theory of the chemical action involved.

In the above description several metallo-organic elements are mentioned and the suitable alkyl or aryl groups are also enumerated. From this it will be clear that any combination of one of the elements from the one group with any of the radicals of the other are satisfactory for the present purposes, but it seems desirable to list specifically compounds which have been found to be particularly valuable for my purposes. This list, it will be understood, is not complete and is merely offered for illustrative purposes:

Triphenyl bismuthine
Ditolyl mercury
Trinaphthyl-alpha propyl bismuthine
Dicresyl cadmium
Cresyl-phenyl zinc
Naphthyl mercuro-iodide
Triphenyl stibine The amounts of the agents which are used are in all cases minute, as much as .01 or .02% producing noticeable effects. It is generally desirable, however, to use 0.2% and it is rare that as much as .50% is required.

The substances mentioned above are effective in many different types of petroleum products, having boiling points above kerosene irrespective of the type or source, whether derived from paraffin or naphthenic or the various mixed base crudes and whether refined by acid, clay, solvent extraction, hydrogenation, destructive hydrogenation or otherwise, including the "white" oils refined to a high degree with strong or concentrated sulphuric acid. As noted above, one of the principal properties of the metallo-organic agents is their efficacy in reducing tendency to sludging, but it will be realized that in no case is this tendency absolutely eliminated, and it is in many cases desirable to add substances of the class of sludge dispersing agents to the oil compositions containing metallo-organic agents.

Example I

A blank sample of well refined lubricating oil, S. A. E. 50, was compared in a series of tests with a sample of the same oil to which was added .05% of di-tolyl mercury.

|  | Unblended oil | Oil with .05% tolyl mercury |
| --- | --- | --- |
| Sligh test (24 hours)_____percent__ | 4.7 | 2.8 |
| Oxidation rate_____ | 103–213–107 | 42–190 |
| Engine sludge_____ | 1–1–1–1–2 | 1–2–2–4 |
| Cone test_____ | .48 | .30 |

The Sligh test was conducted according to the A. S. T. M. procedure except that it was continued for 24 instead of only 2 hours. See Proc. Am. Soc. for Testing Materials in 24,964–II (1924).

The oxidation rate was determined by continually circulating air thru a 10 cc. sample of the oil at a constant rate and determining at 15 minute intervals the amount absorbed as cc. of oxygen.

The engine sludge was determined as mg. of naphtha insoluble residue found at 24 hour intervals while continuously running under constant conditions in a Franklin automobile engine.

The cone test which is found to best accord with ordinary operations represents the naphtha insoluble residue produced in 2 hours time when the oil is allowed to flow at a rate of 30 cc. per hour around a groove cut in an iron cone of standardized dimensions which is held at 250° C. The amount reported is in milligrams.

From the above table it will be seen that the addition agent improved the oil decidedly by reduction of Sligh, initial oxidation rate and by the cone test. The difference according to engine sludge test was within experimental error.

Example II

To another sample of the oil used in Example I is added .2% triphenyl bismuth. The addition agent reduced the cone test deposit from .48 to .22.

A sample containing .05% of this agent reduced the initial oxidation rate to 76–135 and the cone deposit to .32.

Example III

The addition of .2% triphenyl stibine greatly reduced oxidation rate of the oil to which it is added and also reduced the cone test deposit from .40 to .28.

Example IV

A blank sample of an excellent airplane engine oil and samples containing .1% and .2% of triphenyl bismuth respectively showed the following tests.

|  | Blank | .1% | .2% |
| --- | --- | --- | --- |
| Sligh (24 hr.)_____ | .1 | 1.4 | _____ |
| Oxidation rate_____ | 48–63 | 14–69 | _____ |
| Cone test_____ | .24 | .16 | .14 |

Example V

The cone test in a coastal lubricating oil having viscosity of 95 sec. Saybolt at 210° F. was reduced from .31 to .10 by addition of .2% triphenyl bismuth.

Example VI

A well refined lubricating oil having a 905 sec. Saybolt viscosity at 100° F. and a viscosity index between 90 to 100 showed a reduction of cone test deposit from .53 to .16 on addition of triphenyl bismuth.

Example VII

Samples of the blank oil and the oil containing the addition agent used in the prior example were run under carefully controlled conditions in similar engines and after the tests the engines were dismantled and each part rated by an arbitrary system. The total condition of the engine was arrived at by adding the individual demerit numbers of the parts. The blank showed a demerit number of 6.33 and the sample containing the addition agent 2.28 indicating a materially better engine condition.

Example VIII

A blank sample and an identical oil to which was added .2% of diphenyl-chlor-arsine were subjected to the cone test. The oil itself was a S. A. E. 50 lubricating oil. The blank showed a cone deposit of .42, while the oil containing the addition agent showed only .20.

My co-pending application, Serial No. 166,621, filed September 30, 1937, is directed specifically to organic boron compounds in the compositions described above.

The present invention is not limited to any particular addition agents, nor to any theory of the effect of these substances, nor to the particular amounts but only to the following claims.

I claim:

1. A composition of matter comprising a hydrocarbon oil of the type boiling above kerosene, containing an oil soluble metallo-organic agent, the metal being directly joined to a carbon atom of a hydrocarbon radical and selected from the 2nd, 3rd, and 5th groups of the periodic table of elements.

2. A composition of matter comprising a high boiling hydrocarbon oil and an oil soluble metallo-organic agent, the metal being directly joined to a carbon atom of a hydrocarbon radical and selected from the 2nd group of the periodic table.

3. Composition according to claim 2 in which the metallo-organic agent contains a metal selected from the group consisting of mercury, cadmium and zinc.

4. Composition according to claim 2 in which the metallo-organic agent contains a metal element selected from the group consisting of mercury, cadmium and zinc, and contains at least one hydrocarbon radical directly attached to the metallic atom.

5. Composition according to claim 2 in which the metallo-organic agent contains a metal element selected from the group consisting of mercury, cadmium and zinc, and contains at least one cyclic hydrocarbon radical directly attached to the metallic atom.

6. Composition according to claim 2 in which the metallo-organic compound is a compound of mercury containing at least one aromatic hydrocarbon radical.

7. Composition according to claim 2 comprising a lubricating oil and ditolyl mercury.

8. Composition of matter comprising a high boiling hydrocarbon oil and an oil soluble metallo-organic agent containing a metal which is directly joined to a carbon atom of a hydrocarbon radical and is selected from the 3rd group of the periodic table of elements.

9. Composition of matter according to claim 8 in which the metallo-organic compound contains an element selected from a group consisting of thallium, indium, gallium, and aluminum.

10. Composition of matter according to claim 8 in which the metallo-organic agent contains a metal element selected from the group consisting of thallium, indium, gallium, and aluminum and contains at least one hydrocarbon radical directly attached thereto.

11. Composition of matter according to claim 8 in which the metallo-organic agent contains a metal element selected from the group consisting of thallium and aluminum and contains at least one aromatic hydrocarbon radical directly attached thereto.

12. Composition of matter comprising a high boiling hydrocarbon oil and an oil soluble metallo-organic compound containing a metal which is directly joined to a carbon atom of a hydrocarbon radical and is selected from the 5th group of the periodic table of elements.

13. Composition according to claim 12 in which the metallo-organic compound contains an element selected from the group consisting of antimony, arsenic, bismuth and vanadium.

14. Composition according to claim 12 in which the metallo-organic compound contains an element selected from the group consisting of antimony and bismuth.

15. Composition according to claim 12 in which the metallo-organic compound contains an element selected from the group consisting of antimony and bismuth and contains at least one hydrocarbon radical attached directly thereto.

16. Composition according to claim 12 in which the metallo-organic compound contains an element selected from the group consisting of antimony and bismuth and contains at least one aromatic hydrocarbon radical attached directly thereto.

17. Composition according to claim 12 in which the metallo-organic agent is a compound of bismuth with at least one aromatic hydrocarbon radical attached directly thereto.

18. Composition according to claim 12 in which the metallo-organic agent consists of tri-phenyl bismuth.

19. A composition of matter comprising a hydrocarbon oil of the type boiling above kerosene, containing an oil-soluble metallo-organic agent, the metal being directly joined to a carbon atom of an aromatic radical and selected from the 2nd, 3rd and 5th groups of the periodic table of elements.

RAPHAEL ROSEN.